United States Patent
Dalke et al.

(10) Patent No.: US 11,714,453 B1
(45) Date of Patent: Aug. 1, 2023

(54) NOSEPIECE FOR HEAD-MOUNTABLE DEVICE

(71) Applicant: Apple Inc., Cupertino, CA (US)

(72) Inventors: Claire E. Dalke, Foster City, CA (US); Paul X. Wang, Cupertino, CA (US); Liam R. Martinez, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 58 days.

(21) Appl. No.: 17/326,193

(22) Filed: May 20, 2021

Related U.S. Application Data

(60) Provisional application No. 63/042,471, filed on Jun. 22, 2020.

(51) Int. Cl.
*G06F 1/16* (2006.01)

(52) U.S. Cl.
CPC ............ *G06F 1/163* (2013.01); *G06F 1/1637* (2013.01)

(58) Field of Classification Search
CPC ......... G06F 1/163; G02C 5/122; G02C 5/126; G02B 2027/0158
See application file for complete search history.

(56) References Cited

U.S. PATENT DOCUMENTS

| | | | |
|---|---|---|---|
| 8,184,067 B1 | 5/2012 | Braun et al. | |
| 9,069,189 B2 | 6/2015 | Shalon | |
| 9,857,839 B1 * | 1/2018 | Bristol | G06F 1/163 |
| 10,137,028 B2 * | 11/2018 | Castillo | A61F 9/029 |
| 10,642,051 B2 * | 5/2020 | Kamakura | G02B 27/0172 |
| 10,690,936 B2 * | 6/2020 | Heisey | G02B 27/0172 |
| 10,718,950 B2 * | 7/2020 | Kamakura | G02B 27/0172 |
| 11,048,093 B2 * | 6/2021 | Chang | G02B 27/017 |
| 11,391,962 B1 * | 7/2022 | Hatfield | G02C 5/126 |
| 11,409,128 B2 * | 8/2022 | Heisey | G02B 27/0172 |
| 2014/0115761 A1 * | 5/2014 | McNeal | G02C 5/122 2/439 |
| 2017/0168303 A1 * | 6/2017 | Petrov | G02C 11/08 |
| 2018/0024369 A1 * | 1/2018 | Kato | G02C 11/10 359/13 |
| 2018/0031842 A1 | 2/2018 | Tsai et al. | |
| 2018/0239151 A1 * | 8/2018 | Chang | G02B 27/017 |
| 2020/0050236 A1 * | 2/2020 | Lin | G06F 1/163 |
| 2020/0133011 A1 * | 4/2020 | Kamakura | G02C 5/122 |
| 2020/0267378 A1 * | 8/2020 | Kuronuma | H04N 5/64 |

* cited by examiner

*Primary Examiner* — Nidhi Thaker

(74) *Attorney, Agent, or Firm* — Bakerhostetler

(57) ABSTRACT

A head-mountable device can include a nosepiece that distributes forces away from a top of the nose to the sides of the nose. The nose contact elements of such nosepieces can be slideably and/or rotationally biased to apply forces to the sides of the nose when the head-mountable device is worn by a user. Such distribution allows forces to be spread across a greater area, which improves overall comfort, positioning, and light sealing of the head-mountable device.

18 Claims, 6 Drawing Sheets

NOSEPIECE FOR HEAD-MOUNTABLE DEVICE

CROSS-REFERENCE TO RELATED APPLICATION

This application claims the benefit of U.S. Provisional Application No. 63/042,471, entitled "NOSEPIECE FOR HEAD-MOUNTABLE DEVICE," filed Jun. 22, 2020, the entirety of which is incorporated herein by reference.

TECHNICAL FIELD

The present description relates generally to head-mountable devices, and, more particularly, to head-mountable devices with a nosepiece for resting on a nose of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
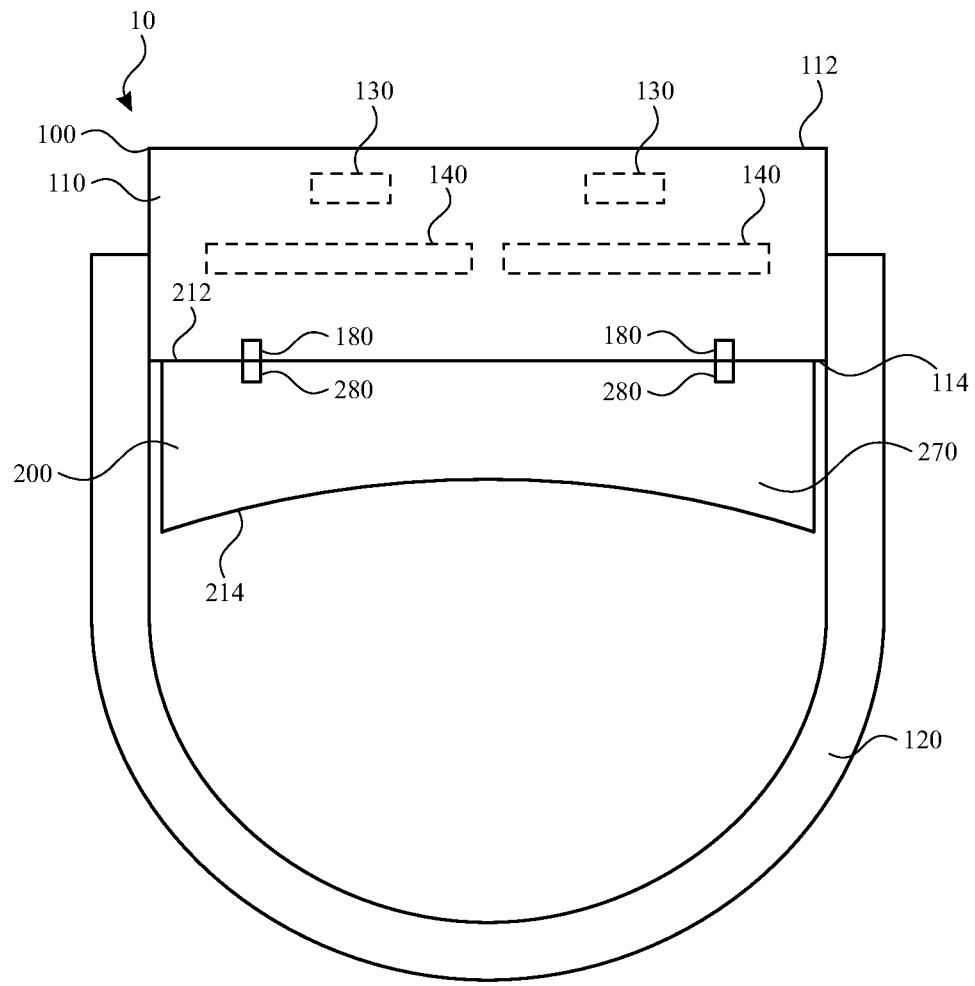
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can contact a nose of a user, in addition to other areas of the user's head. It can be desirable to maximize the fit and comfort on the user, so that usage of the head-mountable device for extended durations is not difficult for the user.

Due to variations in nose features across different users, a given head-mountable device may require adjustment to accommodate different users. For example, different users can have noses with different depths, widths, and lengths. Accordingly, a nosepiece of a particular shape may have a different effect and/or fit on different users. In particular, the distribution of forces may be uneven and/or focused on a small area, such as the bridge on the top of the nose. A greater proportion of the weight can be distributed, for example, to the sides of the nose so that the user does not fatigue for use of the head-mountable device.

Additionally, it can be desirable for a nosepiece to provide a proper fit to ensure alignment of the head-mountable device with the head of the user, including the eyes for observation of the display elements of the head-mountable device. It can also be desirable for a nosepiece to facilitate sealing so that light from an external environment does not enter into the region between the display elements and the eyes of the user.

Systems of the present disclosure can provide a head-mountable device that distributes weight and/or other forces across wide areas of a nose. A head-mountable device can include a nosepiece that distributes forces away from a top of the nose to the sides of the nose. The nose contact elements of such nosepieces can be slideably and/or rotationally biased to apply forces to the sides of the nose when the head-mountable device is worn by a user. Such distribution allows forces to be spread across a greater area, which improves overall comfort, positioning, and light sealing of the head-mountable device.

These and other embodiments are discussed below with reference to FIGS. 1-10. However, those skilled in the art will readily appreciate that the detailed description given herein with respect to these Figures is for explanatory purposes only and should not be construed as limiting.

According to some embodiments, for example as shown in FIG. 1, a head-mountable device 10 includes an HMD module 100 and a light seal module 200. The HMD module 100 includes a frame 110 that is worn on a head of a user. The frame 110 can be positioned in front of the eyes of a user to provide information within a field of view of the user. The HMD module 100 and/or the light seal module 200 can provide a nosepiece to rest on a user's nose.

The frame 110 can be supported on a user's head with a securement element 120. The securement element 120 can wrap or extend along opposing sides of a user's head. The securement element 120 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, the securement element 120 can include multiple components to engage a user's head. The securement element 120 can extend from the HMD module 100 and/or the light seal module 200.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the securement element 120 of the head-mountable device 10.

The frame 110 can include and/or support one or more camera modules 130. The camera modules 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 10 can include display elements 140 that provide visual output for viewing by a user wearing the head-mountable device 10. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

The pair of display elements 140 can be mounted to the frame 110 and separated by a distance. The distance between the pair of display elements 140 can be designed to correspond to the IPD of a user. The distance can be adjustable to account for different IPDs of different users that may wear the head-mountable device 10. For example, either or both of the display elements 140 may be movably mounted to the frame 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

As shown in FIG. 1, the light seal module 200 can include a chassis that provides structural support to one or more other components of the light seal module 200. The chassis 210, or portions thereof, can extend to, from, and/or between the inner side 214 and the outer side 212. The chassis 210 can support a cover 270 that extends at least partially from the outer side 212 to the inner side 214. The chassis and/or the cover 270 can define an interior space through which light can pass, thereby providing to the user wearing the head-mountable device a view of a display element of the HMD module 100. Such a view can be enhanced by preventing the ingress of light from the external environment and into the light seal module 200.

As further shown in FIG. 1, attachment elements can facilitate coupling of the HMD module 100 to the light seal module 200 in a relative position and orientation that aligns the display elements 140 of the HMD module 100 in a preferred position and orientation for viewing by the user. The HMD module 100 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the HMD module 100 and the light seal module 200 together. The modules can remain secured to each other until an optional release mechanism is actuated. The release mechanism can be provided on an outer surface of the head-mountable device 10 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the light seal module 200 to conform to the face of the user to enhance comfort and block light from entering the light seal module 200 at the point of contact with the face. For example, the inner side 214 can provide a flexible, soft, elastic, and/or compliant structure.

Figure 2:
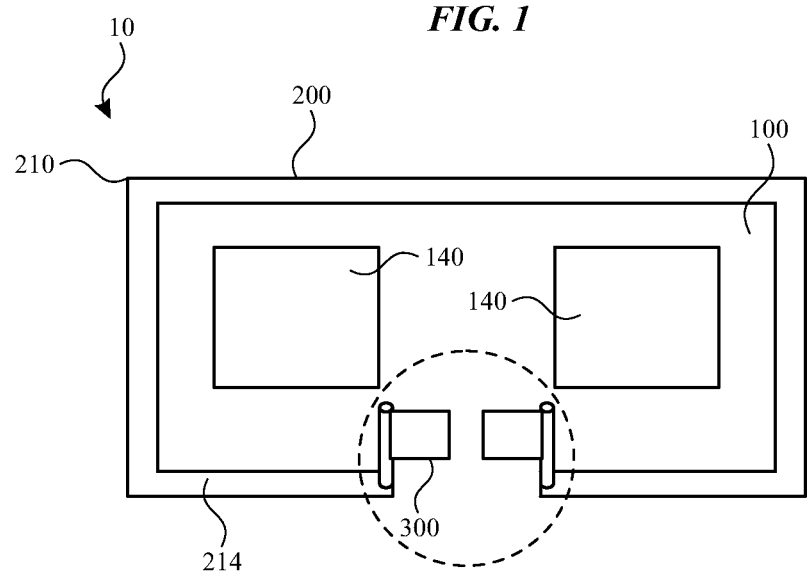
FIG. 2 illustrates a rear view of the head-mountable device of FIG. 1, according to some embodiments of the present disclosure.

As shown in FIG. 2, the head-mountable device 10 can include a nosepiece 300 that engages a nose of a user. For example, while the head-mountable device 10 is worn by a user, with the inner side 214 of the light seal module 200 against the face of the user and/or with the securement element against the head of the user, the nosepiece 300 can rest on a nose of the user. In such a configuration, the HMD module 100, including the display element 140, can also be maintained in a fixed location and orientation with respect to the face and head of the user. Given the variety of nose shapes that different users may have, it can be desirable to provide a nosepiece with proper fit capabilities so that the HMD module 100 is in a desired position and orientation with respect to the face and head of the user during use.

While the nosepiece 300 is shown as mounted to the chassis 210 of the light seal module 200, it will be understood that the nosepiece 300 can be mounted directly to the HMD module 100, for example at the frame thereof. Accordingly, the nosepiece 300 can be directly or indirectly mounted and/or coupled to the HMD module 100 and/or the light seal module 200. While a particular nosepiece is shown in FIG. 2, it will be understood that other types of nosepieces can be provided in place of or in addition to the illustrated nosepiece, including those described herein.

Figure 3:
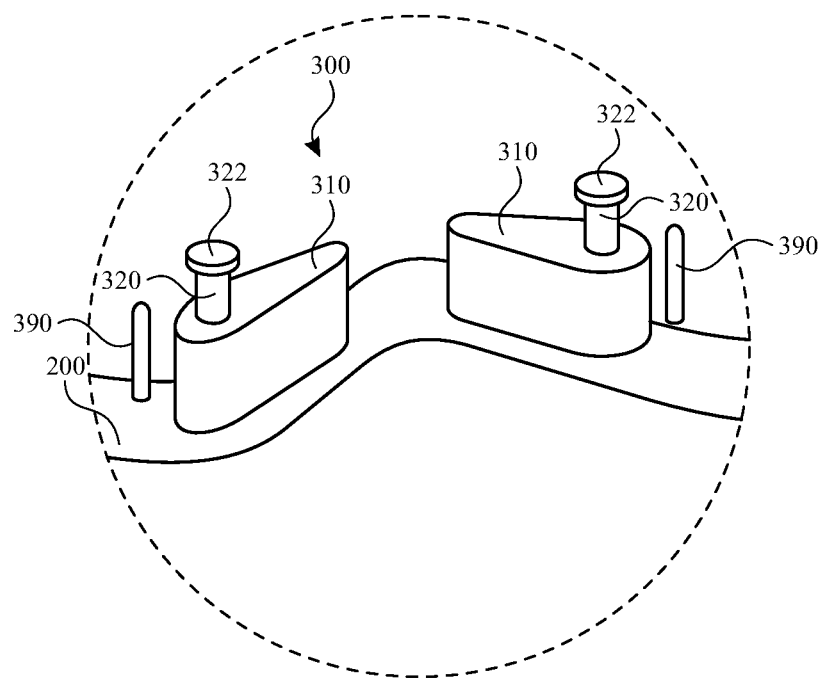
FIG. 3 illustrates an enlarged perspective view of a nosepiece of a head-mountable device, according to some embodiments of the present disclosure.
Figure 4:
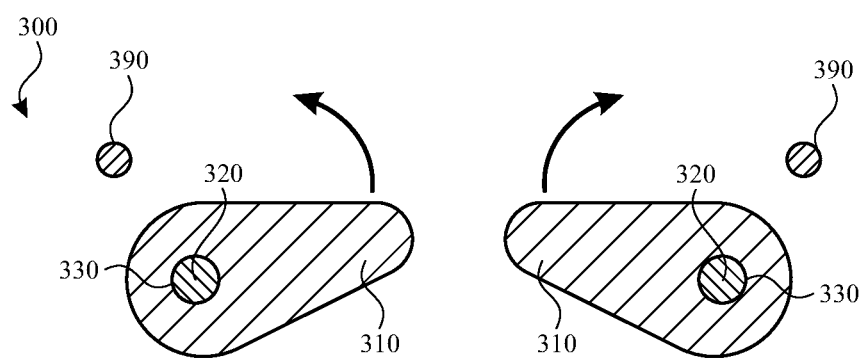
FIG. 4 illustrates a top sectional view of the nosepiece of FIG. 3, according to some embodiments of the present disclosure.
Figure 5:
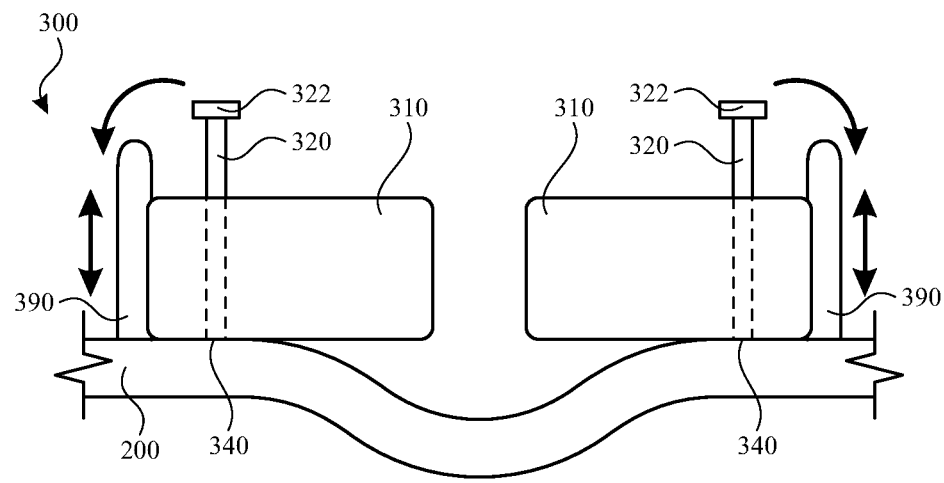
FIG. 5 illustrates a rear view of the nosepiece of FIG. 3, according to some embodiments of the present disclosure.

Referring now to FIGS. 3-5, a head-mountable device can include a nosepiece that provides rotational bias of a nose contact element (e.g., arm) against a nose of a user. As shown in FIG. 3, a nosepiece 300 can be mounted to a chassis of a light seal module 200. Additionally or alternatively, the nosepiece 300 can be directly or indirectly coupled to the inner side of a frame of an HMD module.

As further shown in FIG. 3, the nosepiece 300 can include a pair of posts 320 extending from the chassis of the light seal module 200. The posts 320 can extend parallel to each other or at an oblique angle with respect to each other. For example, the angle can be selected to match the contours of a nose.

As shown in FIGS. 3 and 4, the nosepiece 300 can include a pair of nose contact elements such as arms 310. Each of the arms 310 can be rotatably coupled to a corresponding one of the posts 320. The arms 310 can extend from the posts 320, for example toward each other. The arms 310 can have a range of motion that includes rotations about the posts 320. Upon reaching a particular extent of rotation, the arms 310 can abut the stoppers 390, which are positioned to limit rotation of the arms 310.

As further shown in FIG. 4, the arms 310 can be acted upon by biasing elements 330 that are configured to rotatably bias the arms 310 toward each other. While the arms 310 can be rotated away from each other, for example when receiving a nose there between, they can be biased to a preferred position. As such, the arms 310 can provide a force on sides of the nose while the head-mountable device is worn by a user. Such forces can help stabilize the head-mountable device and distribute the weight away from the bridge of the nose.

The biasing elements 330 can include, for example, torsional springs that are coupled to the arms 310 and the posts 320. By further example, such springs can be positioned between (e.g., radially between) the arms 310 and the posts 320. It will be understood that other spring arrangements can be provided to bias the arms 310.

Additionally or alternatively, the biasing elements 330 can include one or more other force-generating features. For example, the biasing elements 330 can include magnets. Such magnets can be positioned to produce an attractive and/or repulsive force. For example, a magnet can be positioned in an arm 310 and another magnet can be provided in a stopper 390, where the magnets have magnetic field orientations that repel each other, so that the arm 310 is biased away from the stopper 390. Such magnets can be positioned in other locations for a similar effect. It will be understood that magnets can provide biasing with attractive forces with corresponding positions and magnetic field orientations.

Additionally or alternatively, the arms 310 can bend and/or flex to provide an adaptable fit. For example, the arms 310 can extend in direction (e.g., away from the posts 320), and ends of the arms 310 can be flexible to provide a range of motion. As the ends of the arms 310 bend, the arms can alter their shape to conform to a shape of the nose, thereby maximizing contact with the nose and distributing forces across a wider surface area. Such motion can be provided at least at the ends even if a core of the arms 310 does not pivot about the posts 320.

Additionally or alternatively, rotational movement of the arms 310 about the posts 320 and/or with respect to the stoppers 390 can be influenced by forces of gravity. For example, each of the arms 310 can be provided in an orientation and extending from a corresponding post 320 such that, in at least some orientations of the head-mountable device, forces of gravity apply a moment or torque to the arms 310. Under such conditions, the arms 310 can be brought to a preferred position and/or orientation. For example, the moment or torque on the arms 310 resulting from gravity can be balanced against forces provided by the biasing elements 330, the stoppers 390, and the like. By further example, the moment or torque on the arms 310 resulting from gravity can be balanced against a weight of the head-mountable device while worn by a user. By further example, the arms 310 can include a cantilevered portion, and forces applied to the arms 310 can be applied to the cantilevered portion on one side of a post 320 to result in motion of the end of the arm 310 that is on an opposing side of the post 320.

As shown in FIG. 5, the posts 320 can be provided with adjustment capabilities. For example, the posts 320 can each pivot with respect to the chassis of the light seal module 200. Such pivoting action can be facilitated by a hinge, a joint, and/or a structural composition of the post 320 (e.g., flexibility). Such pivoting can allow the posts 320 to tilt relative to each other and change and angle formed there between upon application of a torque to each. The tilting can allow the nosepiece 300 to adjust to the shape and/or size of a user's nose while simultaneously providing a clamping force on the sides of the nose.

Figure 6:
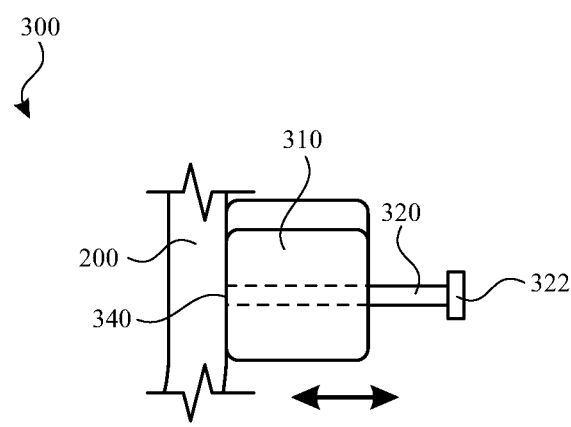
FIG. 6 illustrates a side view of the nosepiece of FIG. 3, according to some embodiments of the present disclosure.

As shown in FIGS. 5 and 6, the nosepiece 300 can provide additional degrees of freedom. For example, the arms 310 can be allowed to move along an axis of the posts 320, for example, within a range defined by the chassis of the light seal module 200 and an end cap 322 of the post 320. A biasing element 340 (e.g., spring, etc.) can be provided to bias the arms 310 along a direction of travel.

Additionally or alternatively, translational movement of the arms 310 along the posts 320 can be influenced by forces of gravity. For example, each of the posts 320 and the arms 310 can be provided in an orientation such that, in at least some orientations of the head-mountable device, forces of gravity apply a force to the arms 310 with at least a component of the force being in a direction along the corresponding post 320. Under such conditions, the arms 310 can be brought to a preferred position. For example, the force on the arms 310 resulting from gravity can be balanced against forces provided by the biasing elements 340. By further example, the force on the arms 310 resulting from gravity can be balanced against a weight of the head-mountable device while worn by a user.

While the biasing forces described herein can be passive, it will be understood that such forces can be actively controlled. For example, a controller of the HMD module can actively control one or more motors, actuators, and like to control the position and/or orientation of a portion of the nosepiece 300. Operable connections can be provided as needed. Control of such components can be guided by sensors that detect conditions, such as the user's facial features.

Figure 7:
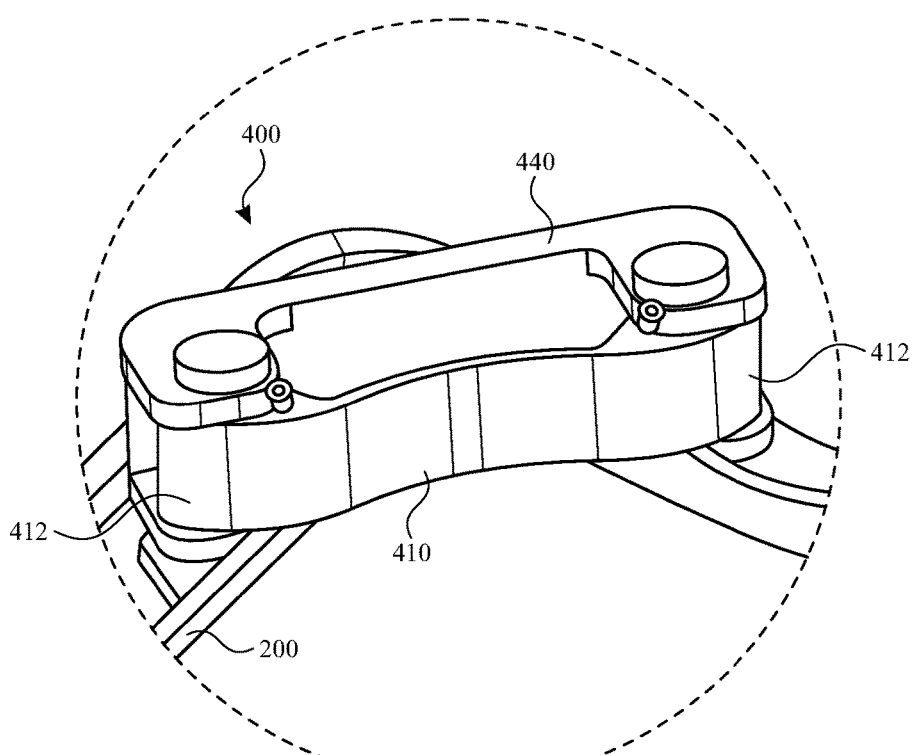
FIG. 7 illustrates an enlarged perspective view of another nosepiece of a head-mountable device, according to some embodiments of the present disclosure.
Figure 8:
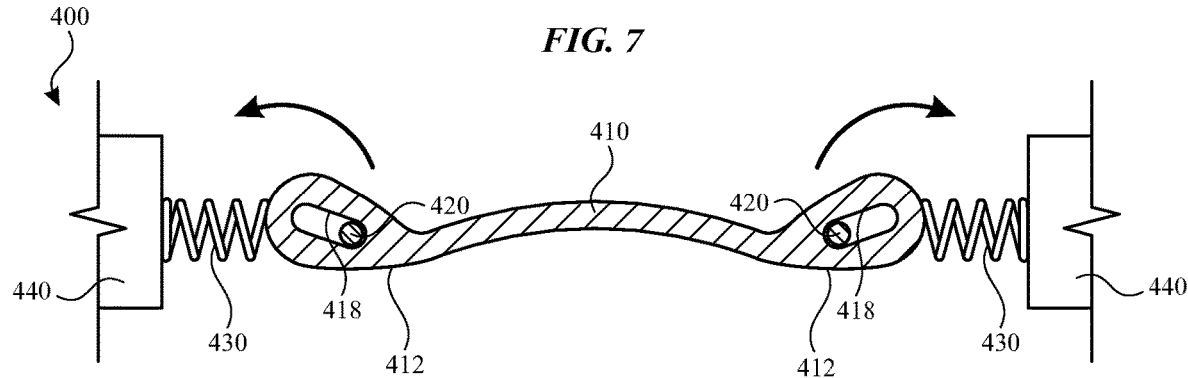
FIG. 8 illustrates a top sectional view of the nosepiece of FIG. 6 in a relaxed configuration, according to some embodiments of the present disclosure.
Figure 9:
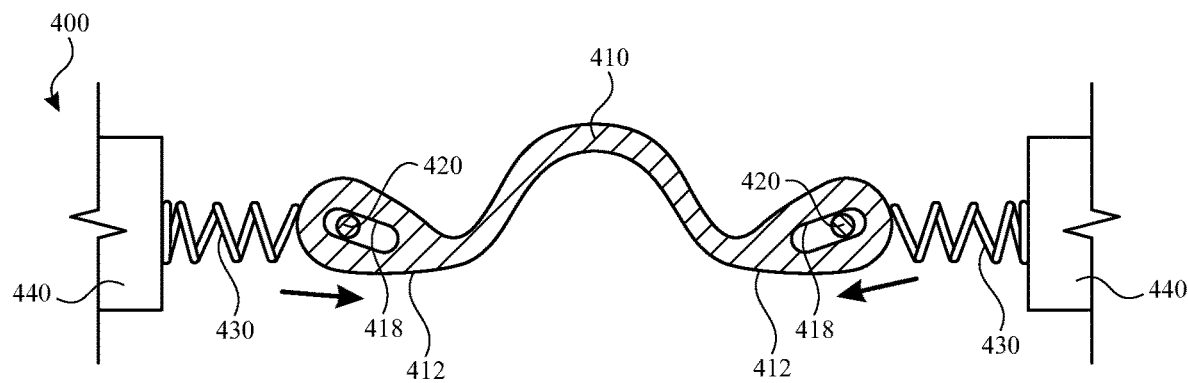
FIG. 9 illustrates a top sectional view of the nosepiece of FIG. 6 in an actuated configuration, according to some embodiments of the present disclosure.

Referring now to FIGS. 7-9, a head-mountable device can include a nosepiece that extends over the top of the nose while providing forces on the sides of the nose with nose contact elements (e.g., bridge element). As shown in FIG. 7, a nosepiece 400 can be mounted to a chassis of a light seal module 200. Additionally or alternatively, the nosepiece 400 can be directly or indirectly coupled to the inner side of a frame of an HMD module.

As further shown in FIG. 7, the nosepiece 400 can include a support 440 that extends from the chassis of the light seal module 200. The supports includes posts 420 (not shown in FIG. 7) that can extend parallel to each other or at an oblique angle with respect to each other. For example, the angle can be selected to match the contours of a nose. The nosepiece 400 can include a nose contact element such as a bridge element 410 with two end portions 412. The end portions can be rotatably coupled to the posts, the support 440, and/or the chassis of the light seal module 200.

As shown in FIG. 8, each of the end portions 412 can define a channel 418 through which the posts 420 extend. The end portions 412 are each rotatable about a corresponding one of the posts 420. The end portions 412 can be freely rotatable, limited by a stopper (not shown), and/or biased to a preferred orientation.

As shown in FIGS. 8 and 9, as the bridge element 410 is moved upward (e.g., as the nosepiece 400 is rested on a nose), the end portions 412 can rotate to facilitate the movement. Rather than focusing the weight of the head-mountable device on the top of the nose, the end portions 412 can be urged inward and towards each other to apply and distribute forces on sides of the nose.

For example, the end portions 412 can have a size and shape that transfers forces to the sides of the nose when the bridge element 410 is moved upwards. As shown, the end portions 412 can join to the bridge element 410 at an angle, such that the extension of the bridge element 410 does not pass through the posts 420. As such, the movement of the bridge element 410 upward and the weight of the head-mountable device itself pulls the end portions 412 inwardly towards each other to apply forces on the sides of the nose, rather than letting the forces be concentrated at the top of the nose.

By further example, the end portions 412 can be thicker, more rigid, and/or less stretchable, while the bridge element 410 can be thinner, more flexible, and/or more stretchable. This allows the forces along the side to be transmitted to the sides of the nose, while the bridge element 410 more readily conforms to the top of the nose. The bridge element 410 can yield to the shape of the nose while the end portions 412 can provide relatively greater resilient against the nose. Such relative differences can be a product of material and/or arrangement thereof.

By further example, the channels 418 can be longer in at least one dimension than the diameter of the posts 420. Such sizing allows the end portions 412 to move and change the position of the channels 418 with respect to the posts 420. Optionally, the posts 420 do not move relative to each other, but instead the end portions 412 move, as accommodated by the size of the channel 418. The channels 418 can extend (e.g., along their greatest dimension)

The end portions 412 can be biased to a preferred position with respect to the posts 420. For example, the end portions 412 can be biased towards each other to apply forces on the sides of the nose. A biasing element 430 can be provided to biased the end portions 412 in such a manner. As shown in FIGS. 8 and 9, the biasing elements 430 can bias the end portions 412 with respect to the support 440 and/or another structure. While the biasing element 430 are illustrated has springs acting on an exterior portion of the end portions 412, it will be understood that other arrangements can provide such biasing. For example, a biasing element can be positioned within the channel 418 to bias the end portions 412 with respect to the posts 420. Yet another biasing element can be coupled to each of a pair of end portions 412 to bias them towards each other with a clamping force or another type of force.

Additionally or alternatively, the biasing elements 430 can include one or more other force-generating features. For example, the biasing elements 430 can include magnets. Such magnets can be positioned to produce an attractive and/or repulsive force. For example, a magnet can be positioned in an end portion 412 and another magnet can be provided in the support 440, where the magnets have magnetic field orientations that repel each other, so that the end portion 412 is biased away from the support 440. Such magnets can be positioned in other locations for a similar effect. It will be understood that magnets can provide biasing with attractive forces with corresponding positions and magnetic field orientations.

While the biasing forces described herein can be passive, it will be understood that such forces can be actively controlled. For example, a controller of the HMD module can actively control one or more motors, actuators, and like to control the position and/or orientation of a portion of the nosepiece 400. Operable connections can be provided as needed. Control of such components can be guided by sensors that detect conditions, such as the user's facial features.

Figure 10:
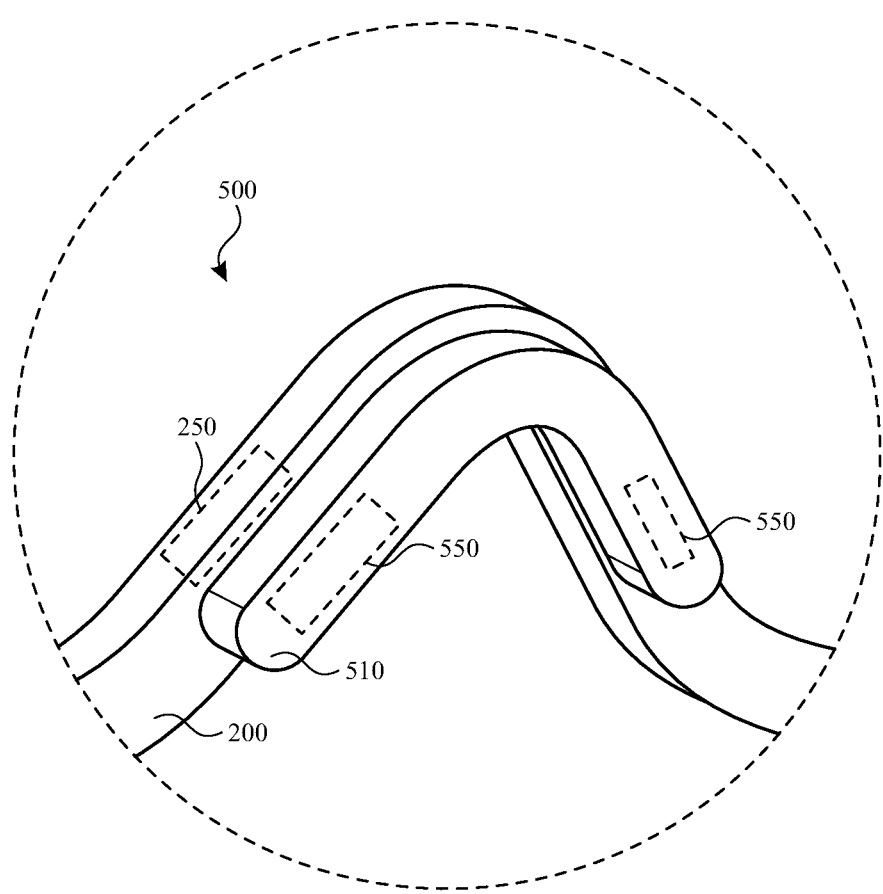
FIG. 10 illustrates an enlarged perspective view of another nosepiece of a head-mountable device, according to some embodiments of the present disclosure.

Referring now to FIG. 10, a modular nosepiece can be exchangeably coupled to the head-mountable device. As shown in FIG. 10, a nosepiece 500 can be coupled to the HMD module and/or the light seal module 200 in a preferred position and orientation. The nosepiece 500 can sealingly engage against the HMD module and/or the light seal module 200 to prevent ingress of light from an external environment. Nosepiece 500 can include nosepiece attachment elements 550 for engaging HMD module attachment elements (not shown) and/or light seal module attachment elements 250.

One or more of various mechanisms can be provided to secure the nosepiece 500 to the HMD module and/or the light seal module 200. For example, mechanisms such as locks, latches, snaps, screws, clasps, threads, magnets, pins, an interference (e.g., friction) fit, knurl presses, bayoneting, and/or combinations thereof can be included to couple and/or secure the nosepiece 500 to the HMD module and/or the light seal module 200. The modules can remain secured to each other until an optional release mechanism is actuated. The release mechanism can be provided on an outer surface of the head-mountable device 10 for access by a user.

As used herein, "modular" or "module" can refer to a characteristic that allows an item, such as a nosepiece, to be connected, installed, removed, swapped, and/or exchanged by a user in conjunction with another item, such as a module of a head-mountable device. Connection of a nosepiece with an HMD module and/or light seal module can be performed and reversed, followed by disconnection and connection of another nosepiece with the same HMD module and/or light seal module. As such, multiple nosepieces can be exchangeable with each other with respect to a given HMD module and/or light seal module.

At least one of the size, shape, profile, dimension, aspect ratio, surface feature, texture, color, and/or markings can be different among multiple nosepieces. For example, different nosepieces can have different sizes and/or shapes to accommodate different nose structures. This can allow a user to choose from among multiple nosepieces that provide different ergonomic features so the user can select one according to comfort provided.

Figure 11:
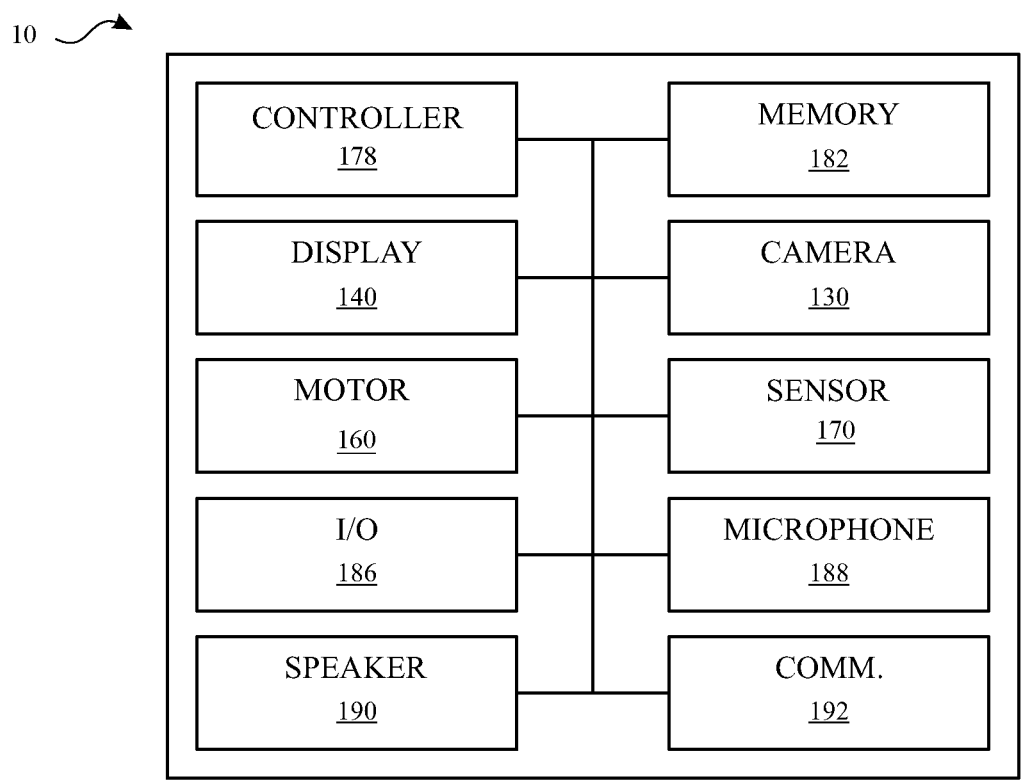
FIG. 11 illustrates a block diagram of a head-mountable device, in accordance with some embodiments of the present disclosure.

Referring now to FIG. 11, components of the head-mountable device can be operably connected to provide the performance described herein. FIG. 11 shows a simplified block diagram of an illustrative head-mountable device 10 in accordance with one embodiment of the invention. It will be appreciated that components described herein can be provided on one, some, or all of an HMD module, a light seal module, a nosepiece, and/or a securement element. It will be understood that additional components, different components, or fewer components than those illustrated may be utilized within the scope of the subject disclosure.

As shown in FIG. 11, the head-mountable device 10 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 140 for close up viewing. The optical subassembly can include one or more lenses, mirrors, or other optical devices.

The head-mountable device 10 can include adjustment control components described herein, such as a motor, an actuator, and the like for moving components to a desired relative position and/or orientation.

The head-mountable device 10 can include one or more sensors 170, such as the sensors of a sensor assembly, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the controller 178 for detection of sound levels and communication of detections for further processing, as described further herein.

The head-mountable device 10 can include the speakers 190 as described herein. The speakers 190 can be operably connected to the controller 178 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device that distributes weight and/or other forces across wide areas of a nose. A head-mountable device can include a nosepiece that distributes forces away from a top of the nose to the sides of the nose. The nose contact elements of such nosepieces can be slideably and/or rotationally biased to apply forces to the sides of the nose when the head-mountable device is worn by a user. Such distribution allows forces to be spread across a greater area, which improves overall comfort, positioning, and light sealing of the head-mountable device.

Various examples of aspects of the disclosure are described below as clauses for convenience. These are provided as examples, and do not limit the subject technology.

Clause A: a head-mountable device comprising: a frame having an outer side and an inner side; a display element supported by the frame; and a nosepiece coupled to the inner side of the frame, the nosepiece comprising: a pair of posts; a pair of arms, each of the arms rotatable about a corresponding one of the posts; and biasing elements configured to rotatably bias the arms toward each other.

Clause B: a head-mountable device comprising: a frame having an outer side and an inner side; a display element supported by the frame; and a nosepiece coupled to the inner side of the frame, the nosepiece comprising: a pair of posts; and a bridge element having end portions each being rotatably coupled to a corresponding one of the posts, the end portions each being slidable across the corresponding one of the posts.

Clause C: a head-mountable device comprising: an HMD module comprising a display element; and a light seal module configured to engage the HMD module; and a securement element configured to secure the head-mountable device to a head of a user; and a nosepiece supported by the light seal module and comprising biasing elements configured to elastically urge nose contact elements against sides of a nose when the head-mountable device is secured to a head of a user by the securement element.

One or more of the above clauses can include one or more of the features described below. It is noted that any of the following clauses may be combined in any combination with each other, and placed into a respective independent clause, e.g., clause A, B, or C.

Clause 1: the frame and the display element are components of an HMD module, the HMD module further comprising an HMD module attachment element; and the nosepiece is a component of a light seal module, the light seal module further comprising: a chassis having an outer side and an inner side; a cover extending about the chassis; and a light seal module attachment element on the outer side of the chassis, the light seal module attachment element being configured to engage the HMD module attachment element.

Clause 2: the biasing elements comprise torsional springs each between a corresponding one of the arms and a corresponding one of the posts.

Clause 3: the biasing elements comprise magnets configured to repel each other upon rotation of the corresponding one of the arms to a rotated configuration.

Clause 4: stoppers each coupled to the frame and positioned to limit rotation of a corresponding one of the arms upon rotation of the corresponding one of the arms to a rotated configuration.

Clause 5: the posts extend parallel to each other.

Clause 6: the posts are configured to tilt away from each other upon application of a torque.

Clause 7: each of the arms is configured to move along an axis of the corresponding one of the posts.

Clause 8: the nosepiece further comprises biasing elements configured to bias the end portions toward each other.

Clause 9: the end portions form channels through which the posts extends, wherein the channels are sized to allow the end portions to move with respect to each other as the channels change their positions with respect to the posts.

Clause 10: the nosepiece further comprises biasing elements configured to urge each of the end portions to a corresponding position with respect to the corresponding one of the posts.

Clause 11: the posts extend parallel to each other.

Clause 12: the nose contact elements are rotationally and slideably coupled to the light seal module.

Clause 13: the biasing elements rotationally bias the nose contact elements relative to the light seal module.

Clause 14: the biasing elements slidably bias the nose contact elements relative to the light seal module.

Clause 15: the nosepiece comprises first attachment elements and the light seal module comprises second attachment elements configured to releasably engage the first attachment elements of the nosepiece.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame having an outer side and an inner side;
   a display element supported by the frame; and
   a nosepiece coupled to the inner side of the frame, the nosepiece comprising:
      a pair of posts; and
      a bridge element having end portions each being rotatably coupled to a corresponding one of the posts, the end portions each being slidable across the corresponding one of the posts, wherein the end portions form channels through which the posts extend, wherein the channels are sized to allow the end portions to move with respect to each other as the channels change their positions with respect to the posts.

2. The head-mountable device of claim 1, wherein:
   the frame and the display element are components of an HMD module, the HMD module further comprising an HMD module attachment element on the inner side of the frame; and
   the nosepiece is a component of a light seal module, the light seal module further comprising:
      a chassis having an outer side and an inner side;
      a cover extending about the chassis; and
      a light seal module attachment element on the outer side of the chassis, the light seal module attachment element being configured to engage the HMD module attachment element.

3. The head-mountable device of claim 1, wherein the nosepiece further comprises biasing elements configured to bias the end portions toward each other.

4. The head-mountable device of claim 1, wherein the nosepiece further comprises biasing elements configured to urge each of the end portions to a corresponding position with respect to the corresponding one of the posts.

5. The head-mountable device of claim 1, wherein the posts extend parallel to each other.

6. A head-mountable device comprising:
   an HMD module comprising a display element;

a light seal module configured to engage the HMD module;

a securement element configured to secure the head-mountable device to a head of a user; and a nosepiece supported by the light seal module and comprising:
- a pair of posts;
- a bridge element having opposing end portions, each of the end portions defining a corresponding channel receiving a corresponding one of the posts; and
- biasing elements configured to elastically urge the end portions towards each other and against sides of a nose when the head-mountable device is secured to the head of the user by the securement element.

7. The head-mountable device of claim 6, wherein:

the HMD module further comprises:
- a frame having an outer side and an inner side; and
- an HMD module attachment element on the inner side of the frame;

the light seal module further comprises:
- a chassis having an outer side and an inner side;
- a cover extending about the chassis; and
- a light seal module attachment element on the outer side of the chassis, the light seal module attachment element being configured to engage the HMD module attachment element.

8. The head-mountable device of claim 6, wherein the end portions are rotationally and slideably coupled to the light seal module.

9. The head-mountable device of claim 6, wherein the biasing elements rotationally bias the end portions relative to the light seal module.

10. The head-mountable device of claim 6, wherein the biasing elements slidably bias the end portions relative to the light seal module.

11. The head-mountable device of claim 6, wherein the nosepiece comprises first attachment elements and the light seal module comprises second attachment elements configured to releasably engage the first attachment elements of the nosepiece.

12. A head-mountable device comprising:
- a frame;
- a display element supported by the frame; and
- a nosepiece supported by the frame and comprising:
  - a pair of posts; and
  - a bridge element having end portions each being rotatably coupled to a corresponding one of the posts, each of the end portions forming a corresponding channel through which a corresponding one of the posts extends, wherein the channels are sized to allow each of the end portions to move with respect to the corresponding one of the posts.

13. The head-mountable device of claim 12, wherein the frame and the display element are components of an HMD module, the HMD module further comprising an HMD module attachment element on an inner side of the frame.

14. The head-mountable device of claim 13, further comprising a light seal module comprising:
- a chassis having an outer side and an inner side;
- a cover extending about the chassis; and
- a light seal module attachment element on an outer side of the chassis, the light seal module attachment element being configured to engage the HMD module attachment element.

15. The head-mountable device of claim 14, wherein the nosepiece is coupled to the frame by the light seal module.

16. The head-mountable device of claim 12, wherein the nosepiece further comprises biasing elements configured to bias the end portions toward each other.

17. The head-mountable device of claim 12, wherein the nosepiece further comprises biasing elements configured to urge each of the end portions to a corresponding position with respect to the corresponding one of the posts.

18. The head-mountable device of claim 12, wherein the posts extend parallel to each other.

* * * * *